United States Patent [19]

De Mets

[11] 3,992,134

[45] Nov. 16, 1976

[54] CONTINUOUSLY OPERATING PREPRESS OR FINISHING PRESS

[75] Inventor: Albert De Mets, Roeselare, Belgium

[73] Assignee: Konstruktiewerkhuize, De Mets N.V., Belgium

[22] Filed: June 2, 1975

[21] Appl. No.: 582,686

[30] Foreign Application Priority Data

May 31, 1974 Germany ............................ 2426385

[52] U.S. Cl. .................................. 425/149; 425/371

[51] Int. Cl.$^2$ ...................... B29C 15/00; B30B 5/06; B30B 15/14

[58] Field of Search ............ 425/149, 364, 371, 373

[56] References Cited

UNITED STATES PATENTS

| | | | |
|---|---|---|---|
| 3,795,470 | 3/1974 | De Mets | 425/371 |
| 3,881,852 | 5/1975 | Ahrweiler | 425/149 |
| 3,883,285 | 5/1975 | De Mets | 425/371 |
| 3,910,179 | 10/1975 | Troutner | 425/371 X |

*Primary Examiner*—J. Howard Flint, Jr.
*Attorney, Agent, or Firm*—Craig & Antonelli

[57] ABSTRACT

A continuously operating press or prepress comprises: two superposed endless platen belts, each formed from a plurality of articulated platens, the superposed endless platen belts defining together a material pressing travel for material being pressed by the press or prepress. The material pressing travel path defines a high pressure zone and an inlet zone where the individual platens of at least one of the endless platen belts move from a configuration in which each platen is angularly offset with respect to the following platen to an essentially coplanar configuration. Moreover, each platen defines a leading projection coplanar with the body portion of the platen and projecting beyond the trailing end of the leading platen attached thereto, and furthermore the body portion of each platen defines a recess for receiving the leading projection of the trailing platen attached thereto. The inventive press or prepress is further provided with drive means for driving the two superposed endless platen belts along respective travel paths and pressure rolls for pressing the platens of the endless platen belts so as to compress the material passing through the inlet zone of the material pressing travel path. In addition, the press or prepress is also provided with control means for controlling the pressure rolls so that variable pressure is exerted on the platens as the platens pass the pressure rolls, maximum pressure being exerted on the platens only when the pressure rolls act on the portions of the platens between the projections and the recesses thereof.

3 Claims, 2 Drawing Figures

1
2
3
4
5
6
7
8
9
9'
10
10'
11
11'
12
13
14
15
16
17
P

CONTINUOUSLY OPERATING PREPRESS OR FINISHING PRESS

BACKGROUND OF THE INVENTION

The present invention relates to a continuously operating prepress or finishing press for the manufacture of panels, such as chipboards, fiberboards, or the like, employing two superposed endless plate-link belts rotating about polygonal rolls arranged horizontally and in parallel to each other, each belt consisting of mutually articulated platens provided on their edges extending at right angles to the travel direction of each endless platen belt with recesses and corresponding projections. Adjacent platens are joined together by way of guide arms mounted or supported only in the zone of (i.e. adjacent) the lateral surfaces of the platens approximately in the depth of the recesses of adjacent platens. Each projection is provided at its free end and each recess at its base with respective rabbets. Moreover, each platen supports itself when in the press inlet zone with its rabbet lug in the open rabbets of the trailing platen as seen in the travel direction. At least one of the two endless platen belts is moveable by at least partially driveable pressure rolls subjected to variable pressure forces by means of hydraulic cylinders and optionally also be exerting a driving force on at least one polygonal roll, and each endless platen belt is surrounded by an endless steel belt.

In a conventional press of this type (see German Utility Model No. 7,315,139), bending forces effective on the projections of the platens can be more readily absorbed, the pressure rolls are always in good contact in the zone of the junction points of adjacent platens, the specific contact pressure to be exerted on the platen belts via the pressure rolls is lower than heretofore, the individual platens can be made to be substantially thinner, the adjacent pins are practically not at all stressed via the pins connecting the guide arms, and the peripheral speed of the endless platen belts and the surrounding endless steel belts can be considerably increased without danger of oscillation of the endless platen belts.

Although the endless platen belts of the aforementioned type have proven themselves well, linear impressions are caused in the chip layer to be compressed when the pressure exerted on the pressure rolls is maintained at an essentially constant level, especially if the speed of rotation of the enless platen belts is increased to raise the output speed of the continuously operating press. This is due at least to the trapezoidal and/or triangular projections of the endless platens of the upper endless plate-link chain. Unfortunately, this effect is realized even in spite of the provision of endless steel belts surrounding the endless platen belts. This, of course, is undesirable.

SUMMARY OF THE INVENTION

Accordingly, an object of the present invention is to prevent the ends of the projections provided on the upper platens of an endless platen belt from forming impressions in the endless steel belt surrounding the endless platen belt and in the chip layer, as the respective platens move to the horizontal position in the inlet zone of the press or prepress.

More specifically, it is an object of the present invention to provide a press or prepress of the type described in which the individual platens of the endless platen belt move to the horizontal position at a maximally small angle, i.e. as flatly as possible.

These and other objects are accomplished in accordance with the present invention by making the pressure of the pressure rolls arranged in the inlet zone and effective on the upper endless platen belt controllable during the rotation of the endless platen belts so that the maximum pressure is exerted on the platens of the endless platen belt only when the pressure rolls are effective on the zone between the recesses and projections of the platens.

This has the effect that in the inlet zone of the press each entering platen is pressed into the horizontal at maximum speed, because practically no pressure is exerted on the endless platen belt in the region where the guide arms are provided which connect the endless platens with each other.

Thus, the present invention provides an endless platen belt assembly for use in a press or prepress for compressing a material comprising a platen belt formed from a plurality of articulated essentially planar platens, each platen defining a leading projection projecting beyond the trailing end of the leading platen attached thereto, the body portion of each platen defining a recess for receiving the leading projection of the trailing platen attached thereto when the platens are coplanar, guide means for guiding the platen belt along a path defining a curved portion followed by a straight portion, pressing means for pressing individual platens as they pass along the curved portion of the path with variable pressure, and control means for controlling the pressing means so that a maximum pressure is exerted by the pressing means on the platens only when the pressing means acts on the portions of the platens between the recesses and projections thereof.

More specifically, the present invention provides a continuously operating press or prepress comprising two superposed endless platen belts, each formed from a plurality of articulated platens, the superposed endless platen belts defining together a material pressing travel path for material being pressed by the press or prepress, the material pressing travel path defining a high pressure zone and an inlet zone where the individual platens of at least one of the endless platen belts move from a configuration in which each platen is angularly offset with respect to the following platen to an essentially coplanar configuration, each platen defining a leading projection coplanar with the body portion of the platen and projecting beyond the trailing end of the leading platen attached thereto, the body portion of each platen defining a recess for receiving the leading projection of the trailing platen attached thereto, drive means for driving the two superposed endless platen belts along respective travel paths, pressure rolls for pressing the platens of said at least one endless platen belt so as to compress the material passing through the inlet zone of said material pressing travel path, and control means for controlling the pressure rolls so that variable pressure is exerted on the platens as the platens pass the pressure rolls, maximum pressure being exerted on the platens only when the pressure rolls act on the portions of the platens between the projections and the recesses thereof.

BRIEF DESCRIPTION OF THE DRAWINGS

The present invention will be explained below with reference to the drawings in which.

DETAILED DESCRIPTION

Figures 1, 2:
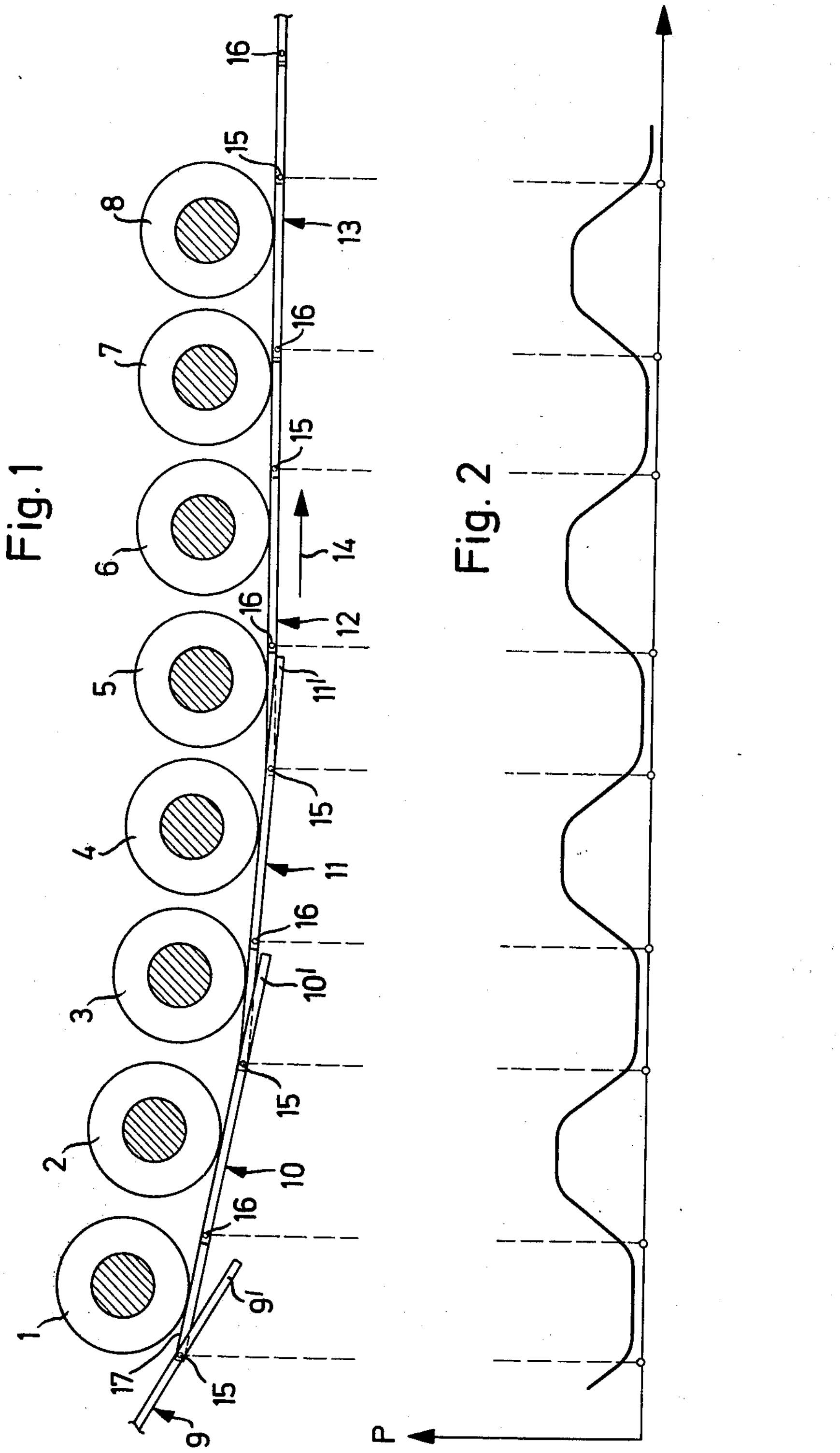
FIG. 1 is a schematic view partly in section showing part of an upper endless platen belt with pressure rolls acting thereon.
FIG. 2 is a schematic view of the pressure curve along the points where the pressure rolls are effective.

As shown in FIG. 1, a press or prepress is provided with pressure rolls 1, 2, 3, 4, 5, 6, 7, 8, etc., of which pressure rolls 1–5 are associated with the inlet zone of the press and of which pressure rolls 6, 7, 8, etc. are associated with the high-pressure zone of the press. As heretofore customary pressure rolls 1, 2, 3, 4, 5, 6, 7, 8, etc., are effective with an essentially constant pressure on driven platens 9, 10, 11, 12, 13, etc., disposed therebelow. As a result, projections 9′, 10′, and 11′, which define the leading portions of the respective platens with respect to the travel direction 14 of the endless platen belt and which are normally triangular or trapezoidal in configuration, are pivoted downwardly as shown in an exaggerated manner in FIG. 1, thus causing the heretofore unavoidable linear impressions in the chip layer. Between junction points 15 and 16 of the mutually following endless platens 9 and 10, the guide arms 17, which connect both platens, are under the effect of the pressure roll 1; the rear projections of platen 10 are in the same position as the guide arms 17. Since platen 9, as it is to be assumed, is not under the effect of some kind of pressure means, leading projection 9′ of this platen is oriented downwardly to a greater extend than the projections 10′ and 11′. If the pressure roll 1 were now to be pressed under considerable pressure against the endless platen belt, this would result in an even more inclined position of the platen. However, if the pressure of the pressure roll 1 is reduced and/or made to assume the value of zero, the inclined position of the platen 9 would be less.

This latter effect is accomplished in accordance with the invention. Specifically, in accordance with the present invention the maximum pressure applied by the pressure rolls is exerted on each of the platens of the endless platen belt only when pressure rolls contact the central zone of a platen. To make this clear, the points of articulation of the individual platens are denoted by the same reference numerals 15 and 16. Thus, in case a pressure roll is effective on a platen between the articulation points 15 and 16, as indicated for pressure rolls 2 and 4, pressure is exerted on this platen. As soon as a pressure roll enters the proximity of an articulation point 16, the pressure to which it is exposed is lowered, and this pressure is raised only after a pressure roll has entered the proximity of an articulation point 15. This can be seen approximately from FIG. 2. As a result, the platens move into the horizontal relatively quickly and the leading projections of each platen are supported with their front ends on the proceding platen. Of course, the pressure curve showing the pressure exerted on the pressure rolls can also be adjusted differently from that illustrated in FIG. 2, this latter figure merely serving for explanatory purposes.

It is further pointed out that it is known to influence each of the upper pressure rollers by means of pistons guided within hydraulic cylinders (U.S. Pat. No. 3,598,040) in order to be able to adjust the compressive forces to be exerted by the individual pressure rollers. Thus, it is only necessary to control the hydraulic cylinders in such a way as is recommended according to the invention.

Although only a single embodiment of the present invention has been described above, it should be appreciated that many modifications can be made without departing from the spirit and scope of the invention. All such modifications are intended to be included within the scope of the present invention which is to be limited only by the following claims.

I claim:

1. A continuously operating press or prepress comprising:

two superposed endless platen belts each formed from a plurality of articulated platens, the superposed endless platen belts defining together a material pressing travel path for material being pressed by said press or prepress, said material pressing travel path defining a high pressure zone and an inlet zone where the individual platens of at least one of the endless platen belts move from a configuration in which each platen is angularly offset with respect to the following platen to an essentially coplanar configuration, each platen defining a leading projection coplanar with the body portion of said platen and projecting beyond the trailing end of the leading platen attached thereto, the body portion of each platen defining a recess for receiving the leading projection of the trailing platen attached thereto;

drive means for driving the two superposed endless platen belts along respective travel paths;

pressure rolls for pressing the platens of said at least one endless platen belt so as to compress the material passing through the inlet zone of said material pressing travel path; and control means for controlling said pressure rolls so that variable pressure is exerted on said platens as said platens pass said pressure rolls, maximum pressure being exerted on the platens in the inlet zone only when said pressure rolls act on the portions of the platens between the projections and the recesses thereof.

2. A continuously operating prepress or finishing press comprising: two superposed endless platen belts rotating about polygonal rolls arranged horizontally and in parallel to each other, each belt consisting of mutually articulated platens provided on their edges extending at right angles to the travel direction of each endless platen belt with trapezoidal and/or triangular recesses and corresponding projections, adjacent platens being joined together by way of guide arms mounted adjacent the lateral surfaces of the platens approximately in the depth of the recesses of adjacent platens, each projection being provided at its free end and each recess at its base with respective rabbets, each platen when in the press inlet zone supporting itself with its rabbet lug in the corresponding open rabbet of the trailing platen, at least one of the two endless platen belts being moveable at least by partially driveable pressure rolls subjected to variable pressure forces by means of hydraulic cylinders, each endless platen belt being surrounded by an endless steel belt, said prepress or press further comprising control means for controlling the pressure exerted by the pressure rolls on the platens of the upper endless platen belt so that a maximum pressure is exerted by said pressure rolls on the platens of the upper endless platen belt in the inlet zone of the press or prepress only when the pressure rolls act on the portions of the platens between the recesses and projections thereof.

3. An endless platen belt assembly for use in a press or prepress for compressing a material to be processed in a material pressing path of said press or prepress, said assembly comprising:

a platen belt formed from a plurality of articulated essentially planar platens, each platen defining a leading projection projecting beyond the trailing end of the leading platen attached thereto, the body portion of each platen defining a recess for receiving the leading projection of the trailing platen attached thereto when the platens are coplanar;

guide means for guiding said platen belt along a path, said path defining a curved portion followed by a straight portion;

pressing means for pressing individual platens as they pass along the curved portion of said path with variable pressure; and control means for controlling said pressing means so that a maximum pressure is exerted by said pressing means on said platens only when the pressing means acts on the portions of the platens between the recesses and projections thereof.

* * * * *